(12) United States Patent
Park et al.

(10) Patent No.: US 9,762,624 B2
(45) Date of Patent: Sep. 12, 2017

(54) METHOD AND SYSTEM FOR ESTABLISHING A GROUP MESSAGING SESSION IN A COMMUNICATION SYSTEM

(75) Inventors: Sung-Jin Park, Suwon-si (KR); Kyung-Tak Lee, Yongin-si (KR); Seung-Yong Lee, Seoul (KR)

(73) Assignee: Samsung Electronics Co., Ltd. (KR)

(*) Notice: Subject to any disclaimer, the term of this patent is extended or adjusted under 35 U.S.C. 154(b) by 1215 days.

(21) Appl. No.: 12/626,106

(22) Filed: Nov. 25, 2009

(65) Prior Publication Data

US 2010/0135190 A1 Jun. 3, 2010

(30) Foreign Application Priority Data

Nov. 27, 2008 (KR) ........................ 10-2008-0118926

(51) Int. Cl.
*H04L 29/06* (2006.01)

(52) U.S. Cl.
CPC ........ *H04L 65/1069* (2013.01); *H04L 65/403* (2013.01); *H04L 65/1006* (2013.01)

(58) Field of Classification Search
CPC H04L 65/1069; H04L 65/403; H04L 65/1006
USPC .......................... 370/260, 238, 416; 455/518
See application file for complete search history.

(56) References Cited

U.S. PATENT DOCUMENTS

| | | | |
|---|---|---|---|
| 2006/0092863 A1* | 5/2006 | Schmidt .............. | H04L 12/1822 370/260 |
| 2006/0098577 A1* | 5/2006 | MeLampy et al. ........... | 370/238 |
| 2007/0136475 A1* | 6/2007 | Leppisaari et al. ........... | 709/227 |
| 2007/0184867 A1* | 8/2007 | Son et al. ...................... | 455/518 |
| 2008/0032729 A1* | 2/2008 | Luo ............................... | 455/518 |
| 2008/0037574 A1* | 2/2008 | Huh et al. ...................... | 370/416 |
| 2008/0225723 A1* | 9/2008 | Lee et al. ....................... | 370/235 |
| 2009/0077616 A1* | 3/2009 | Lindholm et al. ................. | 726/1 |
| 2009/0172782 A1* | 7/2009 | Taglienti et al. ................. | 726/4 |

* cited by examiner

*Primary Examiner* — Robert M Morlan
*Assistant Examiner* — Mandish Randhawa
(74) *Attorney, Agent, or Firm* — The Farrell Law Firm, P.C.

(57) ABSTRACT

A system and a method for establishing a group messaging session in consideration of a group policy in a communication system. A transmitter-side terminal stores information on a group policy in a group information storage unit, and transmits, to a server, an INVITE message requiring application of the group policy to generation of a group messaging session. The server receives the INVITE message, recognizes that the group policy should be applied to the generation of the group messaging session, and acquires the information on the group policy from the group information storage unit. The server transmits the INVITE message including the acquired group policy information to a receiver-side terminal that is invited to participate in the group session, and receives a response from the receiver-side terminal.

22 Claims, 5 Drawing Sheets

METHOD AND SYSTEM FOR ESTABLISHING A GROUP MESSAGING SESSION IN A COMMUNICATION SYSTEM

PRIORITY

This application claims priority under 35 U.S.C. §119(a) to an application filed in the Korean Industrial Property Office on Nov. 27, 2008 and assigned Serial No. 10-2008-0118926, the content of which is incorporated herein by reference.

BACKGROUND OF THE INVENTION

1. Field of the Invention

The present invention relates generally to a communication system, and more particularly to a system and a method for generating a group messaging session in a communication system.

2. Description of the Related Art

In general, a Session Initiation Protocol (SIP) is a text-based application layer control protocol. The SIP is based on a client-server structure in which a server responds to calls of clients, and enables more than one participant to make, revise, and terminate a session together with each other. Further, the SIP is a protocol located above the User Datagram Protocol/Transmission Control Protocol/Internet Protocol (UDP/TCP/IP) and transmits/receives a message in a request/response manner.

SIP request messages include INVITE (an invitation to participate a session), ACK (acknowledgement to an invitation), BYE (session termination), REGISTER (registration of location information of a user client in a database of a register server), a CANCEL (cancellation of a waiting request), and OPTIONS (request for information from a server).

SIP response messages include status codes, such as 1xx (information response), 2xx (successful response), 3xx (redirection response), 4xx (client error), 5xx (server error), and 6xx (area change error).

Figure 1:
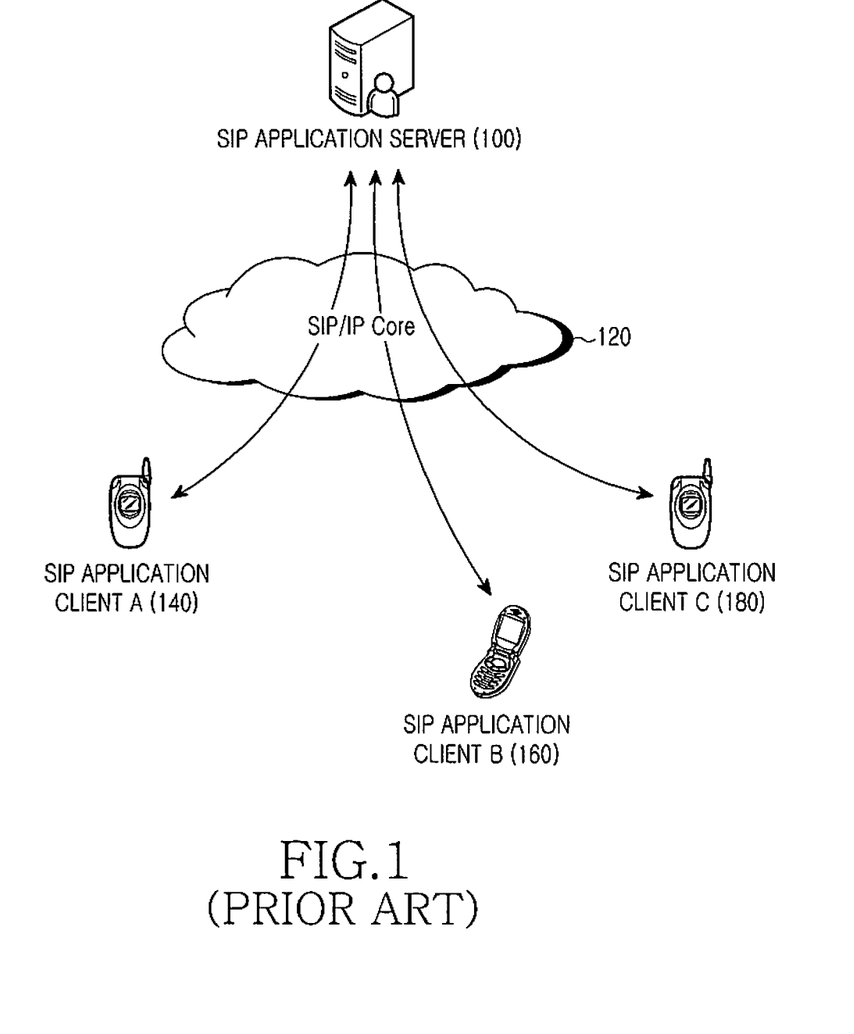
FIG. 1 illustrates a structure of a conventional SIP-based communication system.

FIG. 1 illustrates a structure of a conventional SIP-based communication system.

Referring to FIG. 1, the SIP-based communication system includes a core network 120, and an SIP messaging application server (SIP application server) 100 and multiple application clients 140, 160, and 180. The multiple application clients 140, 160, and 180 communicate with each other through the SIP/IP core network 120.

The SIP application server 100 maintains and manages an SIP session for message transmission and reception between a transmitter-side SIP application client and a receiver-side SIP application client, and generates, maintains, and terminates a session of at least one SIP application client.

In order to support a messaging service of an SIP application client, the SIP/IP core network 120 registers an SIP application client and performs a routing function, that is, receives SIP messages generated for session generation, revision, and termination by an SIP application client and transfers the received SIP messages to the SIP application server 100 or the receiver-side SIP application client.

The SIP application clients 140, 160, and 180 are stationed at user terminals and perform a messaging service. That is, each SIP application client accesses a messaging service and generates, revises, and terminates the SIP session.

Figure 2:
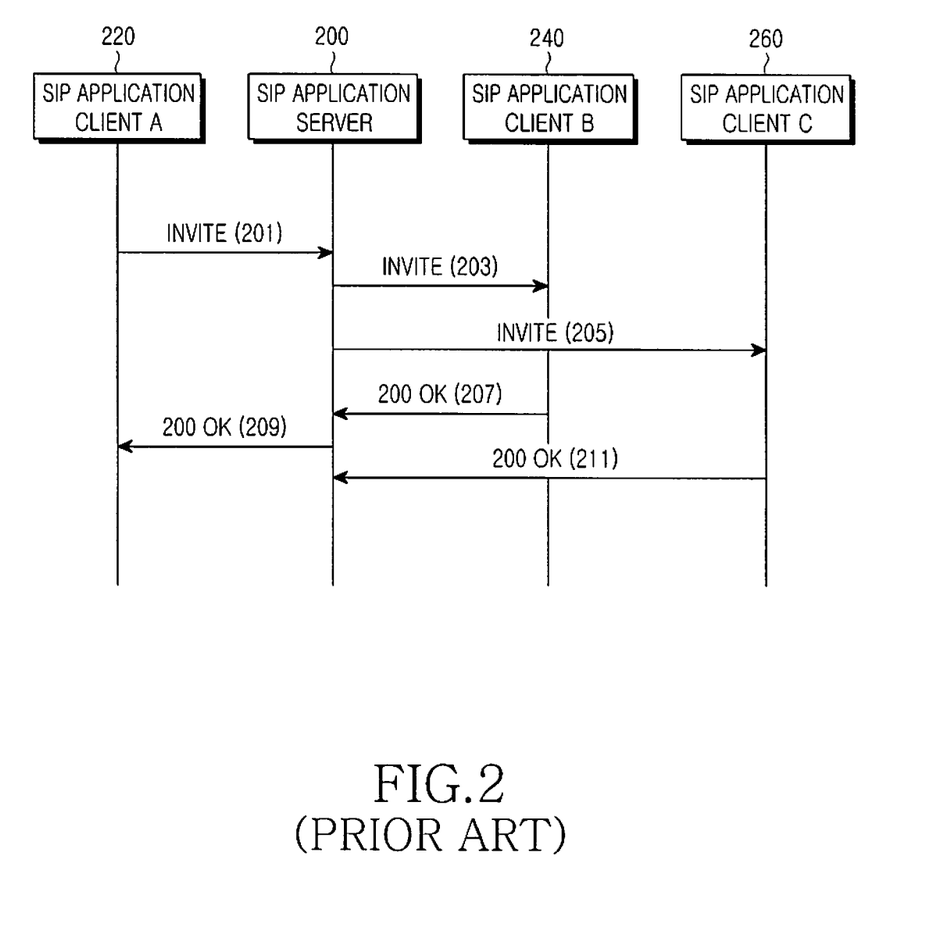
FIG. 2 is a signal flow diagram illustrating signal transmission/reception for session generation in a conventional SIP-based communication system.

FIG. 2 is a signal flow diagram illustrating signal transmission and reception for session generation in a conventional SIP-based communication system.

Referring to FIG. 2, the SIP application client A 220 transmits an INVITE message for generating a session with SIP application client B 240 and SIP application client C 260 to an SIP application server 200 in step 201. In steps 203 and 205, the SIP application server 200 transmits the INVITE message to SIP application client B 240 and SIP application client C 260.

Upon receiving the INVITE message, SIP application client B 240 and SIP application client C 260 transmit a 200 OK message to the SIP application server 200, in steps 207 and 211, respectively. In step 209, the SIP application server 200 transmits a 200 OK message to the SIP application client A 220, as a response to the INVITE message received in step 201.

In the process described above, a session between the SIP application client A 220 and SIP application client B and SIP application client C 260 is generated. A more detailed description of the process illustrated in FIGS. 1 and 2 is disclosed in the Internet Engineering Task Force (IETF) Request For Comments (RFC) 3261 document.

However, the IETF RFC 3261 document does not disclose a scheme for generating a session in consideration of a capability of each SIP application client. That is, the conventional technology does not considered a group policy, which may operate as one of the mechanisms of authenticating users in generating a group messaging session.

SUMMARY OF THE INVENTION

Accordingly, the present invention has been made to solve at least the above-described problems occurring in the prior art, and an aspect of the present invention provides a system and a method of generating a group messaging session in consideration of a group policy in a communication system.

Another aspect of the present invention provides a system and a method of generating an Ad-hoc group messaging session in consideration of a group policy in a communication system.

In accordance with an aspect of the present invention, there is provided a method for establishing a group messaging session in a communication system, the method including a transmitter-side terminal storing information on group policy in a group information storage unit, and transmitting an SIP-based INVITE message requiring application of the group policy to generation of a group messaging session to a server; the server receiving the INVITE message, recognizing that the group policy should be applied to the generation of the group messaging session, and acquiring the information on the group policy in the group information storage unit; the server transmitting the INVITE message including the acquired group policy information to at least one receiver-side terminal that will participate in a group session; and the server receiving a response message to the transmitted INVITE message from said at least one receiver-side terminal.

In accordance with another aspect of the present invention, there is provided a method for establishing a group messaging session in a communication system. The method includes transmitting an SIP-based INVITE message including information on group policy and requiring application of group policy to generation of a group messaging session to a server; receiving the INVITE message; recognizing that the group policy should be applied to the generation of the group messaging session; acquiring the information on the group policy in the INVITE message; transmitting the received INVITE message to at least one receiver-side terminal that will participate in a group session; and receiving a response message to the transmitted INVITE message from said at least one receiver-side terminal.

In accordance with another aspect of the present invention, there is provided a system for establishing a group messaging session in a communication system. The system includes a transmitter-side terminal storing information on group policy in a group information storage unit, and transmitting an SIP-based INVITE message requiring application of the group policy to generation of a group messaging session to a server; and the server receiving the INVITE message, recognizing that the group policy should be applied to the generation of the group messaging session, acquiring the information on the group policy in the group information storage unit, transmitting the INVITE message including the acquired group policy information to at least one receiver-side terminal that will participate in a group session, and receiving a response message to the transmitted INVITE message from said at least one receiver-side terminal.

In accordance with another aspect of the present invention, there is provided a system for establishing a group messaging session in a communication system. The system includes a transmitter-side terminal transmitting an SIP-based INVITE message including information on a group policy and requiring application of the group policy to generation of a group messaging session to a server; and a server receiving the INVITE message, recognizing that the group policy should be applied to the generation of the group messaging session, acquiring the information on the group policy in the INVITE message, transmitting the received INVITE message to at least one receiver-side terminal that will participate in a group session, and receiving a response message to the transmitted INVITE message from said at least one receiver-side terminal.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Hereinafter, certain embodiments of the present invention will be described with reference to the accompanying drawings. In the following description, a detailed description of known functions and configurations incorporated herein will be omitted when they tend to obscure the subject matter of the present invention.

In accordance with an embodiment of the present invention, a system and a method are provided for generating a group messaging session in consideration of a group policy in a communication system.

More specifically, SIP application clients (e.g., mobile terminals) register their own addresses in an SIP/IP core network. The SIP/IP core network stores information on a corresponding SIP application client, based on a request of the SIP application client. Therefore, when an SIP application client wants to generate a group messaging session, i.e., an ad-hoc a group messaging session, the SIP application client registers its own information in the SIP/IP core network as described above and transmits a message requesting generation of an Ad-hoc group messaging session to its own SIP/IP core network using a group messaging session generation Uniform Resource Identifier (URI) received from the messaging service provider.

The SIP/IP core network performs address determination and location determination by using the received message of the SIP application message and then transfers the group messaging session generation request message to a home SIP application server in which the SIP application client has been registered.

Upon receiving the message, the SIP application server prepares for generation of a group messaging session and transfers the group messaging session generation request message to the receiver-side SIP application clients that are candidates for group inclusion. The receiver-side SIP application clients send OK response messages (200 OK) to the transmitter-side SIP application clients, and then the group messaging session is generated.

Hereinafter, two schemes for generating the group messaging session according to the present invention will be discussed.

According to the first scheme, a group policy is stored in a group policy storage unit, and, upon receiving an indicator of the SIP application server, which instructs application of the group policy, whenever generating the group messaging session, the SIP application server retrieves the group policy from the group policy storage unit and applies the group policy to generate the group messaging session. According to the second scheme, the SIP application client transmits an INVITE message including a group policy directly to the SIP application server.

Figure 3:
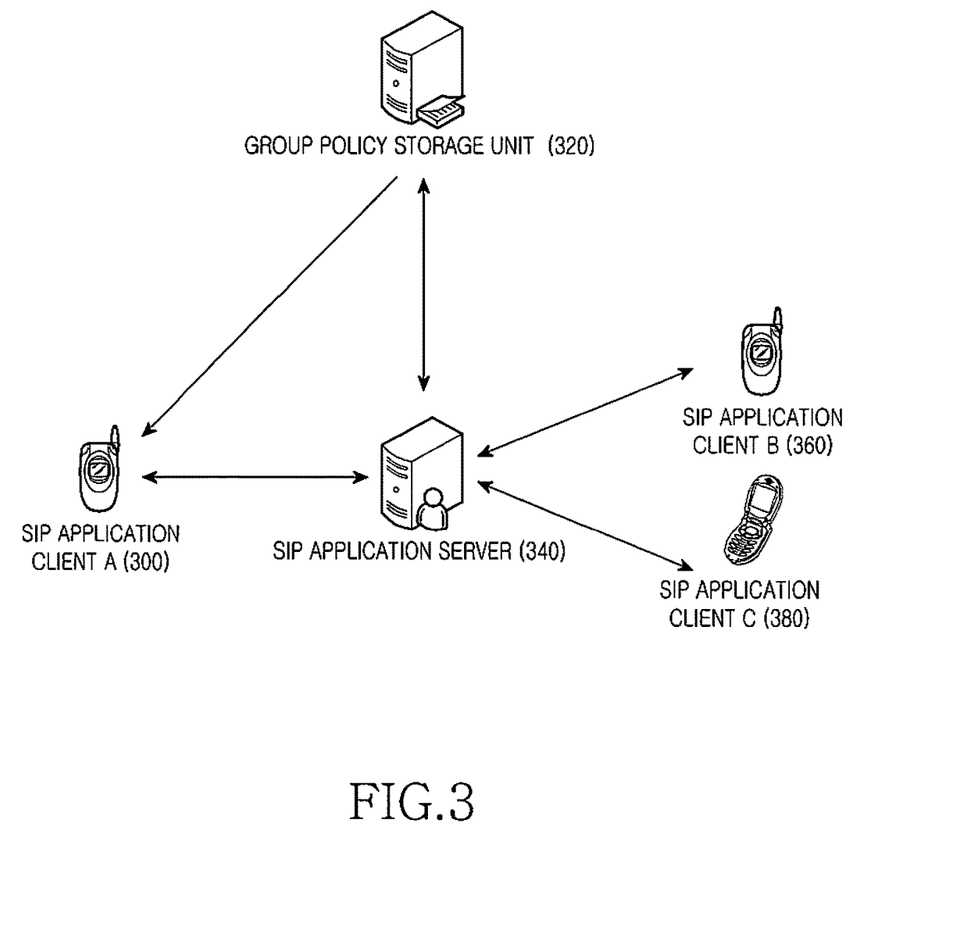
FIG. 3 illustrates an SIP-based communication system in accordance with an embodiment of the present invention.

FIG. 3 illustrates an SIP-based communication system according to an embodiment of the present invention.

Referring to FIG. 3, the SIP application client A 300 prepares a group policy, which the user wants to apply, using eXtensible Markup Language (XML), and transmits the prepared policy to a group policy storage unit 320 in a HyperText Transfer Protocol (HTTP) PUT message. Information on the group policy included in the HTTP PUT message is stored in the group policy storage unit 320.

Sometime thereafter, the SIP application client A 300 transmits an INVITE message including an indicator notifying whether to apply the group policy to the SIP application server 340. The process described up to now corresponds to the first scheme described above. According to the second scheme, the SIP application client A 300 may directly insert the information relating to the group policy in the INVITE message for generation of the group messaging session and transmit the INVITE message to the SIP application server 340.

When the SIP application server 340 receives the INVITE message according to the first scheme, the SIP application server 340 retrieves the stored information relating to the group policy from the group policy storage unit 320 and refers to the information in generating the group messaging session. Alternatively, when the SIP application server 340 has received the INVITE message according to the second scheme, the SIP application server 340 generates a group messaging session using the group policy included in the INVITE message.

Figure 4:
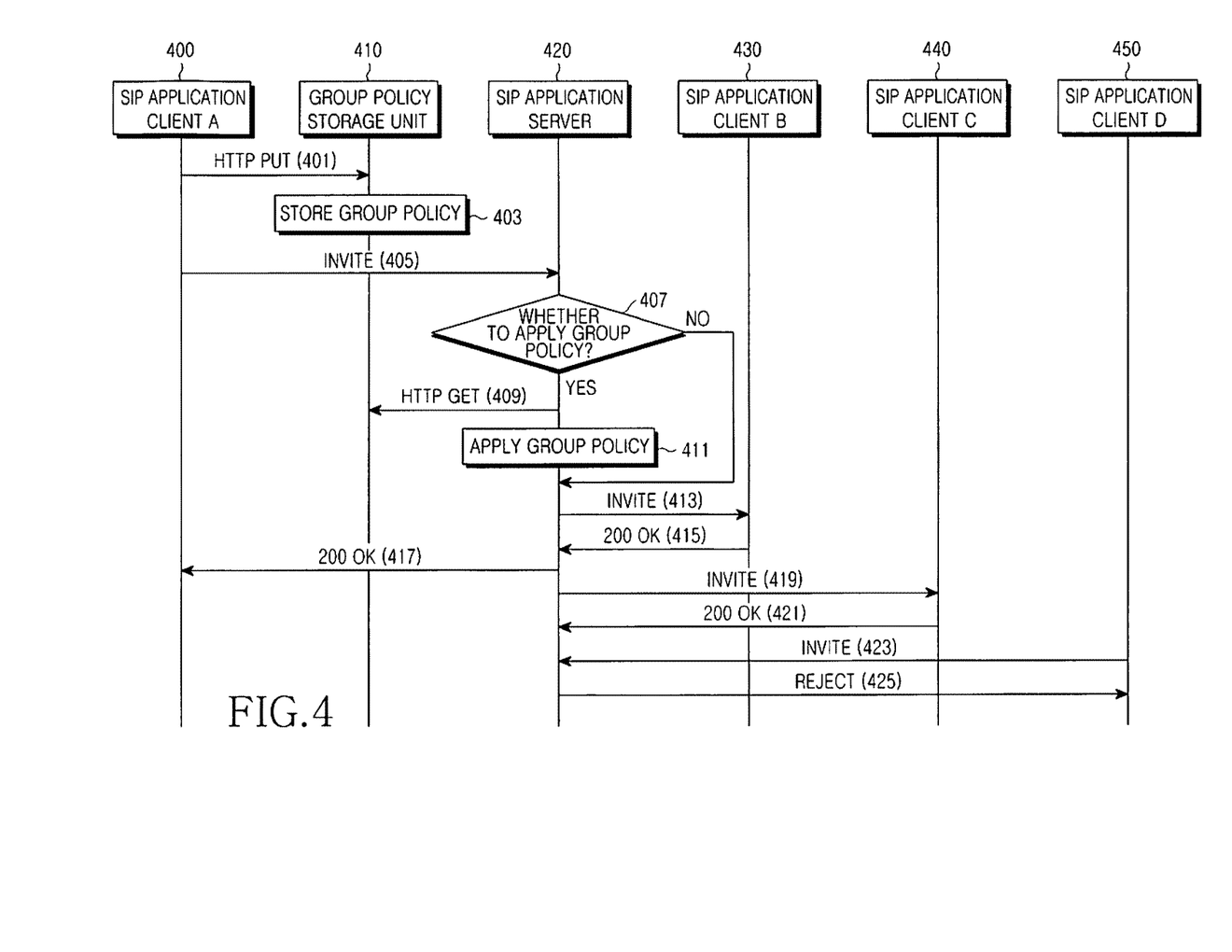
FIG. 4 is a signal flow diagram of a process for generating a group messaging session in consideration of a group policy according to an embodiment of the present invention.

FIG. 4 is a signal flow diagram of a process of generating a group messaging session in consideration of a group policy according to an embodiment of the present invention, i.e., the first scheme.

Referring to FIG. 4, the SIP application client A 400 transmits a new HTTP PUT message of the present invention to a group policy storage unit 410 in step 401.

For example, the HTTP PUT message may have the following format.

```
PUT /org.openmobilealliance.group-ruleset/users/
    sip:joshua@example.com/Adhoc.xml HTTP/1.1
Host: xcap.example.com
...
Content-Type: application/Group-Rule+xml
Content-Length: (...)
<?xml version="1.0" encoding="UTF-8"?>
<Group-Rule xmlns="urn:ietf:params:xml:ns:Group-Rule"
        xmlns:cr="urn:ietf:params:xml:ns:common-policy">
  <Group name="Ad-hoc Group">
    <cr:conditions>
        <cr:identity>
            <cr:one id="sip:joshua@example.com"/>
            <cr:one id="tel:+82-10-9500-1234"/>
        </cr:identity>
    </cr:conditions>
    <cr:actions>
        <Group-Rule-Apply>True</Group-Rule-Apply>
    </cr:actions>
    <max-participant-count>10</max-participant-count>
    <allow-media>
        <file-transfer/>
        <audio/>
    </allow-media>
    <banned-participant>
        <entry uri="sip:mark@example.com"/>
        <entry uri="tel:+82-10-4566-9876"/>
    </banned-participant>
  </Group>
</Group-Rule>
```

In "Org.openmobilealliance.groupruleset/users/sip:Joshua@example.com/Adhoc.xml" in the first to third lines of the HTTP PUT message, "org.openmobilealliance" implies an XML Configuration Access Protocol (XCAP) Root URI, "group-ruleset" implies that the name of the group policy document of the group policy storage unit is "group-ruleset," "users/sip:Joshua@example.com" implies that it is a group policy for a user named Joshua, and "/Adhoc.xml" implies a group policy for an ad-hoc group. That is, it implies that a group policy on an Ad-hoc group messaging session of the user named Joshua will be stored as an XML document in the group policy storage unit. When using "pre-defined.xml" instead of "Adhoc.xml," it implies that it is a group policy on a group in which users to participate in the session have already been determined.

"Content Type: application/Group-Rule+xml" implies that the contents transferred through the HTTP PUT message relates to the group policy and has been prepared in XML format. In the group policy prepared in XML, the condition and action follow the common policy defined in IETF RFC 4745 "Common Policy: A Document Format for Expressing Privacy Preferences." For example, if an Identifier (Id) is "sip:Joshua@example.com" or "tel:+82-10-9500-1234," it implies that the group policy should be applied. That is, it is one of authentication mechanisms for a user applying the group policy.

Further, "Max-participant-count=10" implies that it is possible to invite up to ten persons to the group messaging session, and "file-transfer" and "audio" in "allow media" implies that media corresponding to audio and file transmission are allowed in the group messaging session. The file transmission is used to transmit files, such as text and image, in the group messaging session. In the actual SIP-based session, text is transmitted by a message session relay protocol (MSRP). The text is converted into the form of a file and is then transmitted. Also, "Banned-participant" implies a list of users who cannot participate in the group messaging session. It is also possible to add various content (e.g., age limitation, sex, area, etc.) relating to the group policy, which users require. The added group policy-related content should be shared by all users.

The information on the group policy transferred through the HTTP PUT message is stored in the group policy storage unit 410 in step 403. In step 405, the SIP application client A 400 transmits the INVITE message for generation of the group messaging session to the SIP application server 420. The new INVITE message of the present invention may have the following format.

```
INVITE sip:conf-fact@example.com SIP/2.0
Via: SIP/2.0/UDP atlanta.example.com;branch=z9hG4bKnashds8
To: "Conf Factory" <sip:conf-fact@example.com>
From: Joshua <sip:joshua@example.com>;tag=1928301774
Call-ID:a84b4c76e66710
Cseq:314159 INVITE
Contact:<sip:joshua@atlanta.example.com>
Allow: INVITE, ACK, CANCEL, BYE, REFER
Allow-Events: dialog
Require: group-rule-apply, group-rule-invite
Content-Type:multiparts/mixed;boundary='boundary1'
Content-Length: ...
--boundary1
Content-Type: application/sdp
...
--boundary1
Content-Type: application/resource-list+xml
Content-Disposition: recipient-list
...
--boundary1--
```

In the INVITE message, "Require: group-rule-apply, group-rule-invite" refers to an indicator commanding the SIP application server 420 to apply a group policy. That is, when the SIP application server 420 has received the INVITE message, the SIP application server 420 identifies whether to apply the group policy in step 407. When the INVITE message includes the indicator, the SIP application server 420 acquires the information on the group policy from the group policy storage unit 410 by using an HTTP GET message in step 409. In contrast, when the INVITE message does not include the indicator, the SIP application server 420 transmits an INVITE message, which does not include a group policy, to the SIP application client B 430 and the SIP application client C 440 in steps 413 and 419, respectively.

In the "require" header, "group-rule-apply" implies that it is necessary for the receiver-side (i.e., the SIP application server) of the INVITE message to apply the group policy. That is, it is an indicator requesting the receiver-side to acquire a group policy from the group policy storage unit 410 and apply the group policy. Although the group policy is acquired after the INVITE message is received in FIG. 4, the group policy may be acquired before the INVITE message is received.

If the INVITE message includes "group-rule-apply", after the SIP application server already acquires the group policy, it is also possible that the acquisition process is not performed and the already-acquired group policy is applied. Further, the "group-rule-invite"indicator implies that the receiver-side should recognize that the Ad-hoc group messaging session should understand and apply the group policy. Thereafter, the SIP application server having received the "group-rule-invite" indicator should insert the "group-rule-invite" indicator and the group policy prepared in the format of XML in the require header of the INVITE message transmitted to receiver-side clients.

The SIP application server 420 applies the acquired group policy in step 411, and transmits the INVITE message to the SIP application client B 430 and the SIP application client C 440, respectively, in steps 413 and 419. That is, the SIP application server 420 transmits an INVITE message having a require header including a "group-rule-invite" indicator and a group policy prepared in XML. Further, the "Content-Disposition" header of the transmitted INVITE message may include "Group-rule; handling=optional."

As described above, the INVITE message transmitted from the SIP application server 420 to the receiver-side SIP application client B 430 and the receiver-side SIP application client C 440 may have the following format.

```
INVITE sip:bill@example.com SIP/2.0
...
To: Bill <sip:bill@domain.com>
From: Joshua <sip:joshua@example.com>
Require: group-rule-invite
...
Content-Type:multiparts/mixed;boundary='boundary1'
...
--boundary1
Content-Type:application/Group-Rule+xml
Content-Disposition:Group-Rule;handling=optional
<?xml version="1.0" encoding="UTF-8"?>
<Group-Rule xmlns="urn:ietf:params:xml:ns:Group-Rule"
         xmlns:cr="urn:ietf:params:xml:ns:common-policy">
 <Group name="Ad-hoc Group">
    <cr:conditions>
       <cr:identity>
          <cr:one id="sip:joshua@example.com"/>
          <cr:one id="tel:+82-10-9500-1234"/>
       </cr:identity>
    </cr:conditions>
    <cr:actions>
       <Group-Rule-Apply>True</Group-Rule-Apply>
    </cr:actions>
    <max-participant-count>10</max-participant-count>
    <allow-media>
       <audio/>
       <image/>
    </allow-media>
    <banned-participant>
       <entry uri="sip:mark@example.com"/>
       <entry uri="tel:+82-10-4566-9876"/>
    </banned-participant>
 </Group>
</Group-Rule>
```

In the INVITE message, "group-rule-invite" implies that when the receiver-side SIP application client B 430 and the receiver-side SIP application client C 440 have received the INVITE message, they should identify the group policy prepared in XML and recognize that the group policy should be applied to the generation of the group messaging session. The "Group-rule; handling=optional" implies that, upon receiving the INVITE message, the receiver-side SIP application client B 430 and the receiver-side SIP application client C 440 should output the contents of the group policy on the user screen if the output is possible and disregard output of the corresponding content type if the output is impossible.

The SIP application server 420 receives a 200 OK message from each of the SIP application clients 430 and 440 as a response message to the INVITE message of steps 413 and 419, respectively, in steps 415 and 421. According to the reception of the 200 OK message, a group messaging session is generated. Further, the SIP application server 420 transmits a 200 OK message to the SIP application client A 400 as a response message to the INVITE message received in step 405 in step 417.

In FIG. 4, it is assumed that an SIP application client D 450 has transmitted an INVITE message to the SIP application server 420 in step 423, requesting participation in the group messaging session, but that the SIP application client D 450 does not conform to the conditions for participation in the group messaging session, i.e., the group policy. Therefore, the SIP application server 420 transmits a reject message denying participation of the SIP application client D 450 in the group messaging session in step 425.

Figure 5:
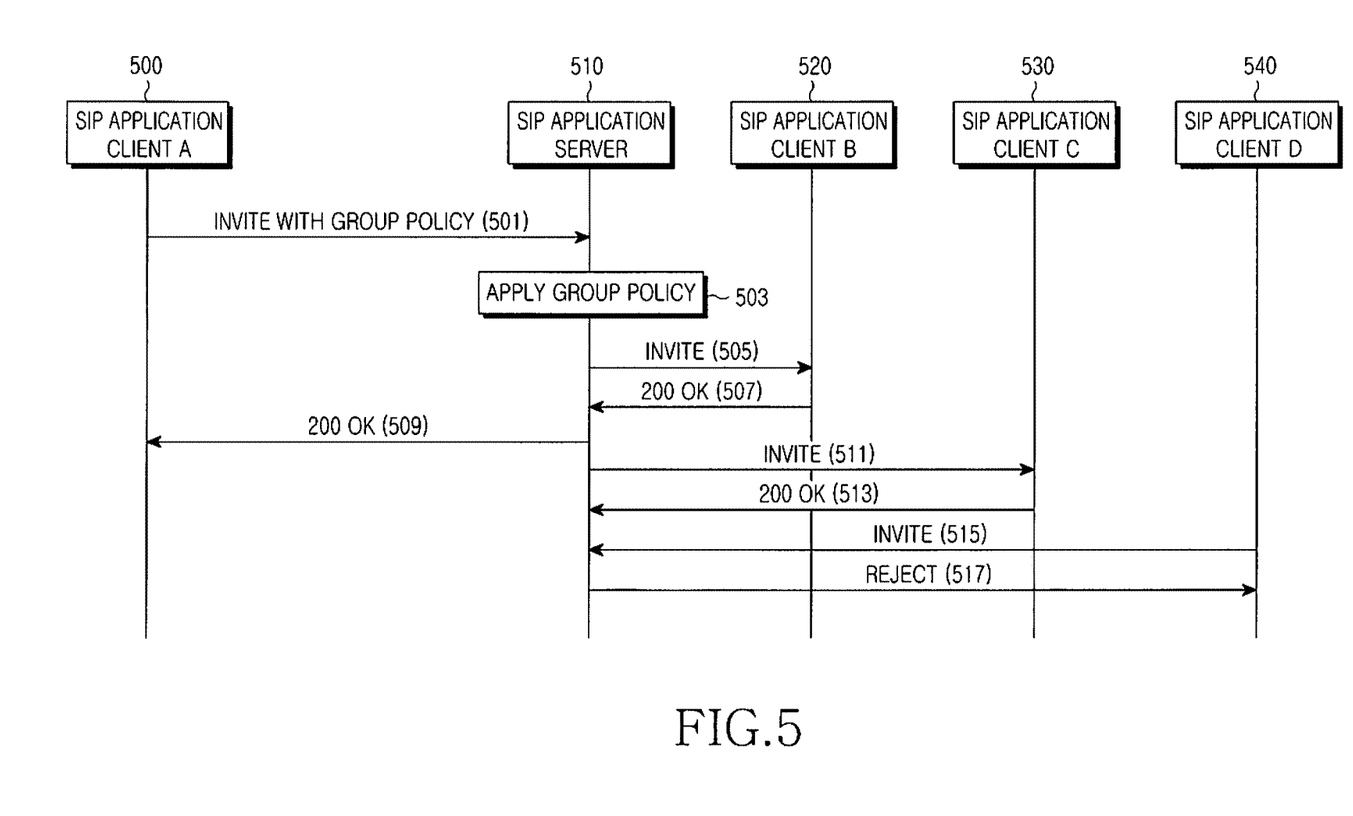
FIG. 5 is a signal flow diagram of a process for generating a group messaging session in consideration of a group policy according to another embodiment of the present invention.

FIG. 5 is a signal flow diagram of a process of generating a group messaging session in consideration of a group policy according to another embodiment of the present invention, i.e., the second scheme.

Referring to FIG. 5, the SIP application client A 500 transmits an INVITE message including information on the group policy to the SIP application server 510 in step 501. In step 503, the SIP application server 510 receives the INVITE message and recognizes that the group policy should be applied to generation of the group messaging session. For example, the INVITE message including information on the group policy may have the following format.

```
INVITE sip:conf-fact@example.com SIP/2.0
...
To: "Conf-factory" <sip:conf-fact@domain.com>
From: Joshua <sip:joshua@example.com>
Require: group-rule-apply, group-rule-invite
...
Content-Type:multiparts/mixed;boundary='boundary1'
...
--boundary1
Content-Type:application/Group-Rule+xml
<?xml version="1.0" encoding "UTF-8"?>
<Group-Rule xmlns="urn:ietf:params:xml:ns:Group-Rule"
         xmlns:cr="urn:ietf:params:xml:ns:common-policy">
 <Group name="Ad-hoc Group">
    <cr:conditions>
       <cr:identity>
          <cr:one id="sip:joshua@example.com"/>
          <cr:one id="tel:+82-10-9500-1234"/>
       </cr:identity>
    </cr:conditions>
    <cr:actions>
       <Group-Rule-Apply>True</Group-Rule-Apply>
    </cr:actions>
    <max-participant-count>10</max-participant-count>
    <allow-media>
       <audio/>
       <image/>
    </allow-media>
    <banned-participant>
       <entry uri="sip:mark@example.com"/>
       <entry uri="tel:+82-10-4566-9876"/>
    </banned-participant>
 </Group>
</Group-Rule>
```

In the INVITE message, "Require: group-rule-apply, group-rule-invite" performs the same functions as those described above with reference to FIG. 4.

Upon receiving the INVITE message, the SIP application server 510 identifies whether to apply the group policy.

Further, the SIP application server 510 transmits the received INVITE message for generation of the group messaging session to the SIP application client B 520 and the SIP application client 530, respectively, in step 505 and 511. The SIP application server 510 receives a 200 OK message as a response to the INVITE message from the SIP application client B 520 and the SIP application client 530, respectively, in steps 507 and 513. According to the reception of the 200 OK message, the group messaging session is generated. Further, in step 509, the SIP application server 510 transmits a 200 OK message to the SIP application client A 500, in a response to the INVITE message received in step 501.

In step 515, the SIP application server 510 receives an INVITE message from the SIP application client D 540. The INVITE message is a message by which the SIP application client D 540 applies for participation in the group messaging session. However, the SIP application server 510 transmits a reject message to the SIP application client D 540 by the reason that the SIP application client D 540 does not conform to the conditions for participation in the group messaging session, i.e., the group policy, in step 517.

By generating a group session in consideration of a group policy, as described above, it is possible to authenticate session participating users and also achieve efficient conference management.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of establishing a group session based on a Session Initiation Protocol (SIP) in a server of a communication system including at least two client terminals and the server, the method comprising the steps of:
   receiving an INVITE message including a group policy application indicator from a transmitter-side client terminal;
   identifying the group policy application indicator of the received INVITE message;
   acquiring group policy information of the transmitter-side client terminal stored in a storage unit using the group policy application indicator;
   determining at least one receiver-side client terminal that is invited to participate in the group session based on the acquired group policy information;
   transmitting the INVITE message including the acquired group policy information to the determined at least one receiver-side client terminal; and
   receiving a response message to the transmitted INVITE message from the at least one receiver-side client terminal,
   wherein the group policy information includes a condition for participation in the group session and a maximum number of receiver-side terminals that are allowed to participate in the group session determined by the transmitter-side client terminal, and
   wherein the group policy information is generated and transmitted to the storage unit by the transmitter-side client terminal.

2. The method of claim 1, wherein the group policy information of the transmitter-side client terminal stored in the storage unit is transferred through an SIP-based HTTP PUT message from the transmitter-side client terminal.

3. The method of claim 1, wherein the group is an Ad-hoc group.

4. The method of claim 1, further comprising:
   receiving an INVITE message from another client terminal to join the group session; and
   transmitting a reject message to the another client terminal, when the another client terminal does not meet the condition for participation in the group session.

5. The method of claim 1, wherein the message used in acquiring the group policy information of the transmitter-side client terminal stored in the storage unit is an SIP-based HTTP GET message.

6. The method of claim 1, wherein acquiring the group policy information of the transmitter-side client terminal stored in the storage unit comprises:
   determining if the received INVITE message includes the group policy application indicator; and
   when the received INVITE message includes the group policy application indicator, recognizing that the group policy should be applied to generation of the group session, and acquiring the group policy information of the transmitter-side client terminal stored in the storage unit.

7. The method of claim 6, further comprising transmitting an INVITE message that does not include the group policy information to at least one receiver-side client terminal that will participate in the group session, when the received INVITE message does not include the group policy application indicator.

8. The method of claim 1, wherein the group session is established between the transmitter-side client terminal and the determined at least one receiver-side client terminal when the transmitter-side client terminal has received the response message.

9. A method of establishing a group session based on a Session Initiation Protocol (SIP) in a transmitter-side client terminal of a communication system including at least two client terminals and a server, the method comprising the steps of:
   generating group policy information including a group session participation condition and a maximum number of receiver-side terminals that are allowed to participate in the group session determined by the transmitter-side client terminal;
   transmitting the generated group policy information to a storage unit; and
   transmitting an INVITE message including a group policy application indicator to the server,
   wherein the group policy application indicator notifies the server to acquire the group policy information stored from the storage unit and apply the acquired group policy information, and
   wherein the group session is established when the transmitter-side client terminal has received a response message to the INVITE message including the acquired group policy information from the server, after the server determines at least one receiver-side client terminal that is invited to participate in the group session based on the acquired group policy information, transmits the INVITE message including the acquired group policy information to the determined at least one receiver-side client terminal and receives a response message to the INVITE message from the at least one receiver-side client terminal.

10. The method of claim 9, wherein the generated group policy information is transferred through an SIP-based HTTP PUT message to the storage unit.

11. The method of claim 10, wherein a header of the SIP-based HTTP PUT message includes a parameter indicating that content transferred through the HTTP PUT message relates to the group policy and has been prepared in eXtensible Markup Language (XML).

12. The method of claim 9, wherein the group is an Ad-hoc group.

13. The method of claim 9, wherein the storage unit is included in the server.

14. The method of claim 9, wherein the group session is established between the transmitter-side client terminal and at least one receiver side client terminal that is invited to participate in the group session when the transmitter-side client terminal has received a response message in response to the INVITE message.

15. A method of establishing a group session based on a Session Initiation Protocol (SIP) in a server of a communication system including at least two client terminals and the server, the method comprising the steps of:
receiving an INVITE message including group policy information from a transmitter-side client terminal;
determining if the received INVITE message includes a group policy application indicator;
when the received INVITE message includes the group policy application indicator, acquiring the group policy information using the INVITE message;
determining at least one receiver-side client terminal that is invited to participate in the group session based on the acquired group policy information;
transmitting the INVITE message including the acquired group policy information to the determined at least one receiver-side client terminal; and
receiving a response message to the transmitted INVITE message from the at least one receiver-side client terminal,
wherein the group policy information includes a condition for participation in the group session and a maximum number of receiver-side terminals that are allowed to participate in the group session determined by the transmitter-side client terminal, and
wherein the group policy information is generated by the transmitter-side client terminal.

16. The method of claim 15, wherein the group is an Ad-hoc group.

17. The method of claim 15, further comprising receiving an INVITE message from another client terminal requesting to join the group session; and transmitting a reject message to the another client terminal, when the another client terminal does not meet the condition for participation in the group session.

18. The method of claim 15, wherein the group session is established between the transmitter-side client and the determined at least one receiver-side client terminal when the transmitter-side client terminal has received the response message.

19. A method of establishing a group session based on a Session Initiation Protocol (SIP) in a transmitter-side client terminal of a communication system including at least two client terminals and a server, the method comprising the steps of:
generating group policy information including a group session participation condition and a maximum number of receiver-side terminals that are allowed to participate in the group session determined by the transmitter-side client terminal;
generating an INVITE message including the generated group policy information and a group policy application indicator; and
transmitting the generated INVITE message to the server,
wherein the group policy application indicator requests the server to apply the group policy information, and
wherein the group session is established when the transmitter-side client terminal has received a response message to the INVITE message including the acquired group policy information from the server, after the server determines at least one receiver-side client terminal that is invited to participate in the group session based on the acquired group policy information, transmits the INVITE message including the acquired group policy information to the determined at least one receiver-side client terminal and receives a response message to the INVITE message from the determined at least one receiver-side client terminal.

20. The method of claim 19, wherein the group is an Ad-hoc group.

21. The method of claim 19, wherein the group policy information is prepared in eXtensible Markup Language (XML).

22. The method of claim 19, wherein the group session is established between the transmitter-side client terminal and the determined at least one receiver side client terminal when the transmitter-side client terminal has received the response message in response to the INVITE message.

* * * * *